No. 804,823. PATENTED NOV. 21, 1905.
L. E. BEERS.
COFFEE POT.
APPLICATION FILED FEB. 18, 1905.
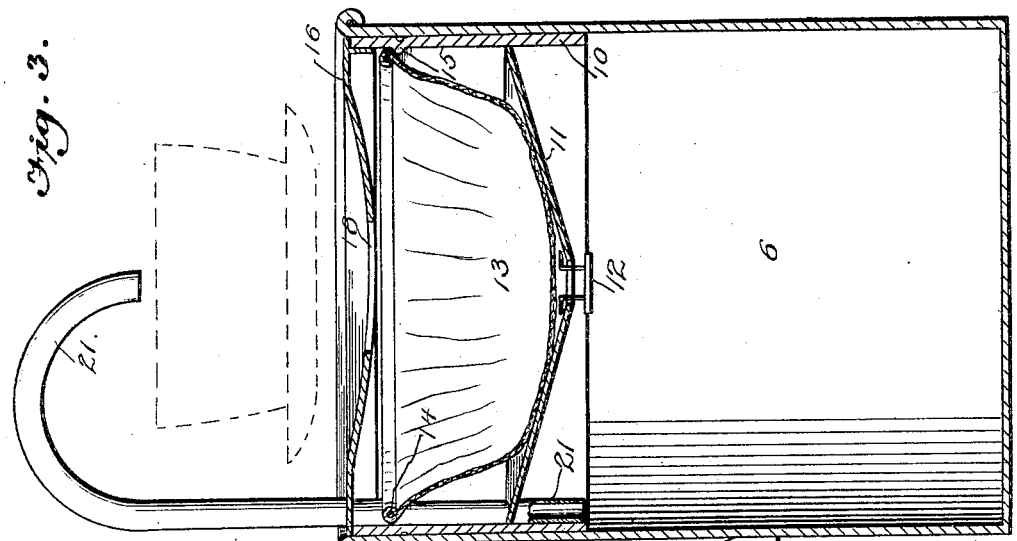
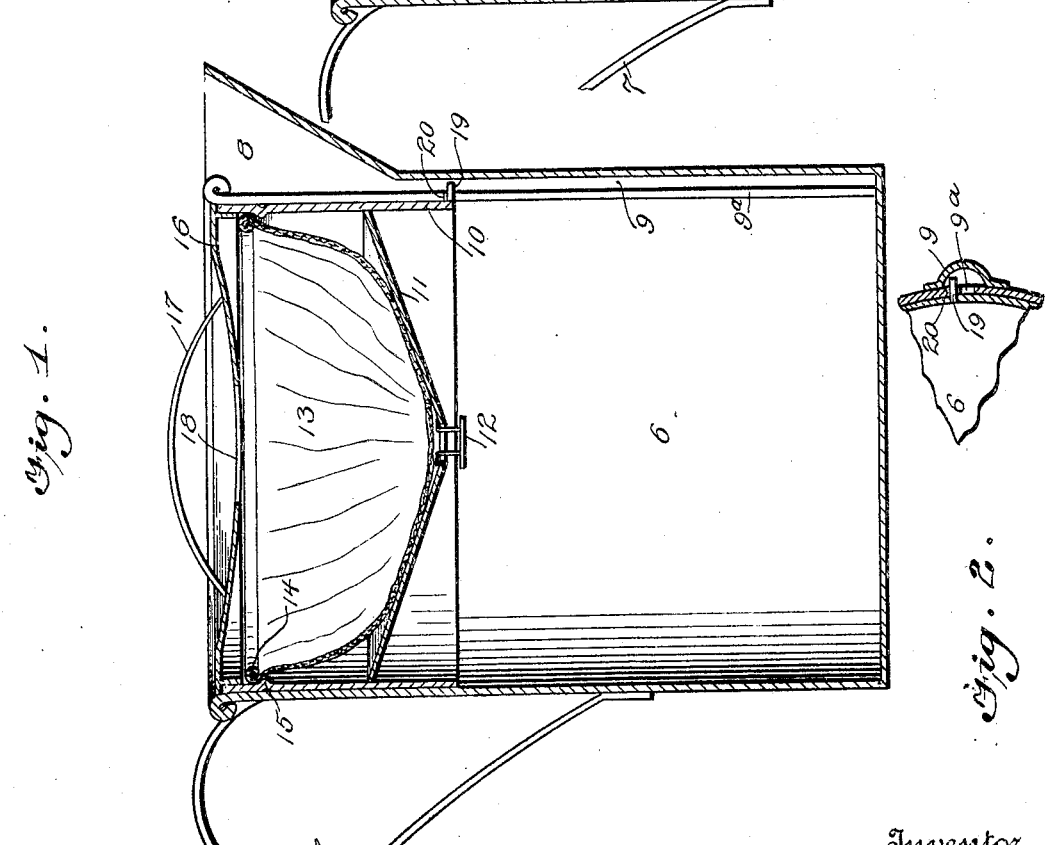
Witnesses
A. R. Walton
Geo. E. Tew
Inventor
Louis E. Beers.
by Milo B. Stevens & Co.
Attorneys

UNITED STATES PATENT OFFICE.

LOUIS E. BEERS, OF POPLARBLUFF, MISSOURI.

COFFEE-POT.

No. 804,823.      Specification of Letters Patent.      Patented Nov. 21, 1905.

Application filed February 18, 1905. Serial No. 246,205.

*To all whom it may concern:*

Be it known that I, LOUIS E. BEERS, a citizen of the United States, residing at Poplarbluff, in the county of Butler and State of Missouri, have invented new and useful Improvements in Coffee-Pots, of which the following is a specification.

This invention is a pot particularly adapted for making coffee, although it may be used for decoctions or extracts of any other substance that is desired. It is particularly designed for making what is known as "drip-coffee," and is characterized by improvement in the means by which the liquid is caused to drip through the coffee repeatedly, if desired. Improved means are also shown for pouring the coffee from the pot.

In the accompanying drawings, wherein the invention is illustrated, Figure 1 is a sectional view of a pot illustrating the invention. Fig. 2 is a fragmentary section showing the means for supporting the holder for the ground coffee in raised position. Fig. 3 is a vertical section of a modified form.

Referring specifically to the drawings, 6 indicates the body of the pot, having a handle 7 and a pouring-spout 8. The spout is extended, as at 9, to reach down to the bottom of the pot, and the side wall of the pot has a slit, as at $9^a$, extending from the top to the bottom thereof.

The coffee-holder consists of an outer shell or ring 10, which fits snug within the pot and has an inclined or hopper bottom 11, opening through a hole in the bottom into the body of the pot. This hole is controlled by a valve 12, which opens downwardly. The holder contains a bag 13, carried by a wire ring 14, which may be conveniently made to rest upon a bead 15, formed in the wall of the holder. Said bag contains the ground coffee. A cover 16, having a handle 17, fits within the top of the holder, and this cover is dished or inclined inwardly and has a hole 18 therethrough at the center. Projecting from one side of the holder is a pin 19, which is constructed to slide in the slot $9^a$ and also to fit within a notch 20 in the edge of the wall of the pot adjacent said slot. Said notch 20 is preferably so located that the pin will fit therein when the holder is flush with the top of the pot.

In use the holder is slidable up and down in the pot. The coffee is placed in the bag in the holder, the latter being supported in raised position by the pin and notch referred to. The liquid after passing through the material drips through the valve 12 and into the body of the pot. To cause it to pass through again, the holder is given a slight twist to disengage the pin 19 from the notch and then pushed down to the bottom of the pot. This closes the valve 12 and forces the liquid up through the passage 9, whence it flows through the slot $9^a$ into the cover 16 and the holder. The holder is then pulled up and the pin engaged in the notch, allowing the decoction to again drip through the valve. This operation may be repeated as often as desired or necessary until the required strength is obtained. The cover 16 fits snugly within the shell 10, but may be removed when desired for removal of the bag.

In the form shown in Fig. 3 a novel form of spout is employed, comprising a tube 21, which is carried by the holder and extends up through the same at one side thereof and is bent over to discharge above the opening 18. This tube is firmly fixed to the holder and acts both as a handle to push the holder up and down and as a spout to discharge the liquid either into the holder or into a cup which may be placed under the end thereof, as indicated in dotted lines in Fig. 3. In this construction the holder is made to fit so tight that it will stay in position without further means. In its operation it will be seen that when the holder is pushed down the liquid will be forced up through the tube 21, so as to again flow through the coffee in the holder or be delivered into a cup, as above referred to.

The inclined or hopper shape of the bottom 11 allows even a small quantity of coffee to be used, since it will naturally collect at the lowest point in the bag over the valve 12 and all of the liquid must flow therethrough.

What I claim as new, and desire to secure by Letters Patent, is—

1. The combination with a pot, of a holder for material, slidable up and down within the same, said holder having a downwardly-opening check-valve in the bottom thereof, and a spout forming a passage leading from below the holder to above the same.

2. The combination with a pot, of a holder slidable up and down within the same, said holder having an inclined bottom with a downwardly-opening valve therein, a bag supported in the holder, over said bottom, and means to allow the passage of liquid from below the holder to above the same, when it is pushed down in the pot.

3. The combination with a pot, of a holder fitting and slidable up and down within the same, said holder having a cover with a hole therethrough, and a bottom with a valved opening therein, a bag supported in the holder between said cover and bottom and means constructed to allow the passage of liquid from below the holder to above the same when it is pushed down in the pot.

4. The combination with a pot, of a holder for material, slidable up and down within the same, and a spout extending up through the holder and curved downwardly at the top to discharge either into the holder or into a cup which may be placed under said spout.

In testimony whereof I have signed my name to this specification in the presence of two subscribing witnesses.

LOUIS E. BEERS.

Witnesses:
W. SPRIGG BROWN,
T. J. McIVER.